United States Patent Office 3,493,399
Patented Feb. 3, 1970

3,493,399
PANCREATIC FOOD PRODUCT
Ezra Levin, 1109 W. University Ave.,
Champaign, Ill. 61820
No Drawing. Filed Apr. 11, 1967, Ser. No. 629,932
Int. Cl. A23b 1/04
U.S. Cl. 99—208                        17 Claims

ABSTRACT OF THE DISCLOSURE

A high protein and high biologic value pancreatic meat product which is in dry powder form, is substantially free of active enzymes, and is substantially free of undesirable organoleptic factors of taste and smell. Such food product is prepared by dehydrating and substantially defatting a pancreatic residue from which substantially all the enzymes have been removed or deactivated. The food product is rendered palatably acceptable by being treated with an alcohol.

---

This invention relates to a food prepared from pancreas; and the invention particularly relates to a food which is present as a dried meat powder and which has high biologic or nutritional value. The high biologic value arises from a high protein content which has high levels of desirable amino acids. The pancreatic dry meat food product of this invention is free of objectionable taste and odor properties.

Animal pancreas has been used extensively since the art learned of successful extraction of insulin therefrom. In addition to its widespread use as a source of natural insulin enzyme, fresh animal pancreas has been used in various other ways, particularly as a source for the other valuable enzymes found in this material. For example, animal pancreas has been dehydrated and defatted to provide a more convenient and concentrated form of its inherent enzymes and other active therapeutic factors. A method for preparing such an enzyme source is taught by the applicant in his issued U.S. Patent No. 2,503,313; and such preparations have been available under the trademark "Viokase," supplied by the VioBin Corporation.

Great quantities of animal pancreatic residue is continually made available to the art and industry following extraction of insulin enzyme from fresh animal pancreas. The insulin is conventionally extracted with an acid-alcohol medium which, in the process, inactivates most of the pancreatic enzymes except the desired insulin. The pancreatic "residue" which remains after insulin extraction is a malodorous product which has high quantities of fat. This residue is potentially a source of high nutritional protein which has, however, never been considered as a food source because of many and varying reasons. Such reasons may have included the complete unacceptability because of reprehensible smell and taste. Further, it has unesthetic qualities with respect to its fat content, its texture, body and the like.

The art has never suggested that such animal pancreas residue be used in an ingestible and acceptable food source, other than animal feed, because of problems such as the foregoing. The art offered no suggestion for overcoming such objections, and has, therefore, been denied a particularly valuable addition because not only is animal pancreas an immense source of protein, but a protein of high biologic value. The protein content of pancreas is rich in high levels of desirable amino acids, particularly tryptophane.

A dehydrated and defatted food product will always possess some appeal to the art because of its ease in handling, its relative permanence and non-susceptibility to spoilage, and its versatility for incorporation or mixture with other food sources. The foregoing U.S. Patent No. 2,503,313 has disclosed a dry powdered form which is a rich source of enzymes but, understandably, such a rich enzyme content eliminates this form as a general food source which could be presented for high nutritional purposes.

In view of the vast amounts of potentially available animal pancreas as an acceptable food source it is, therefore, one primary object of this invention to provide a pancreatic meat product prepared from such an available source, which meat product is acceptable to the taste and smell and which is essentially a high protein source with essentially no fat, water, or enzymes present therein.

Another object of this invention is to utilize the vast amounts of pancreatic residue remaining after insulin extraction for conversion to a high biologic value food product in which all objectionable organoleptic factors have been eliminated.

A still further object of this invention is to obtain a pancreatic meat product from the sources described, which meat product is in a dry, powdered form so that the variations and versatility of its use may be enhanced.

Yet another object of this invention is a pancreatic food product, obtained from sources described, which can be successfully formed into a dry, high protein form with no objectionable organoleptic factors by relatively simple and economical process steps. The preparation of the food product by such relatively simple and economical process steps encourages wide commercial availability of the product to provide the art with a high nutritional quality food source that is particularly high in desirable amino acid levels.

Objects such as those recited are attained, together with still other objects which will occur to practitioners, by the following invention which will be now described in detail.

The pancreatic food product is prepared from "pancreatic residue," that is, the tissue material remaining after extracting animal pancreas with acid-alcohol in the conventional way to obtain the insulin. Such pancreatic residue is obtained from various animal pancreas such as hogs or cattle. Such pancreatic residue further contains high levels of fat of generally over 20% by weight. This residue is also referred to in the art as "pancreas waste" and it is a malodorous fatty product with a taste which is totally unacceptable. The objectionable organoleptic factors in such waste or residue has also been referred to as leading to a "gutty" odor and taste.

Such a pancreas residue has a low water content of about 10% by weight, but water removal does not present a serious problem in converting the food product into a dry, powdered meat form. While the pancreatic residue, in the form received, is useless as a food source, it has been found to be important as the potential source for the food product because substantially all the known enzymes of such product are either removed or inactivated. This is an important feature because it allows this most plentiful source of pancreas to be particularly adapted to an economical and nutritious food source.

A marked economical advantage arises from the invention because substantially all the conventional and known enzymes are removed or inactivated in the conventional well-known insulin extraction process with an acid-alcohol medium. Such a medium extracts or inactivates all the enzymes except the desired insulin. Although the pancreatic waste or residue is organoleptically repulsive in its raw state, it possesses inherent properties which makes it particularly adaptable to a readily acceptable, very high protein source, of exceptional biologic value. It is an important contribution of this invention that greatly available sources of pancreatic residue, which are useless as a general food product, can be converted to a food product which is not only acceptable, but particularly advantageous with respect to its nutritional content.

The invention provides in part that such pancreatic residue is processed by defatting the residue with various organic fat solvents which are known and used for defatting. A preferred solvent is a polar organic solvent. Such a solvent attains two important purposes, namely, it defats the residue to trace levels and it removes phosphatides which could be potentially converted to glyceride forms which would lead to objectionable taste and smell factors after the passage of time.

The pancreatic residue is preferably comminuted or ground as in a hammermill grinder to desirable small particle sizes, say about 0.5" in diameter. Such particles may then be immersed in the organic fat solvent and mixed, if desired, throughout the fat extraction process. Fat is desirably extracted until the content is reduced to about 1-2% fat by weight. Following this initial extraction to reduce the fat to the desired level, the substantially defatted material may be exposed to a counterflow of an organic fat solvent to remove any possibly occluded fat.

The use of an organic fat solvent reduces the fat to the desired levels and removes the phosphatides, but the product still retains objectionable odor and taste. The defatted tissue material is then contacted with alcohol to remove the undesirable taste and odor. Various alcohols may be used for this purpose, but it is preferred to use the lower alcohols such as methanol, isopropanol and the like. The defatted comminuted tissue material is contacted with the alcohol for a period sufficient to remove the undesirable odors and any other undesirable organoleptic factors. Not only does the alcohol extraction remove the bad odors and taste, but it also further reduces the fat content to only trace levels of, say, less than 1% by weight.

After the alcohol treatment, the material is dried and is obtained as a powdered meat product having a fat content in trace levels, and a protein content of at least about 80% by weight. The high protein, low-fat pancreatic meat powder is free of objectional organoleptic factors and is essentially tasteless. It is readily acceptable for ingestion and may be used in various ways in the diet as, for example, by mixture with flour to make breadstuffs, incorporating in other baking forms, mixing with cereals or high carbohydrate foods such as rice and potatoes, incorporation into cereals, and the like.

The high protein source of the pancreatic meat powder, of course, results in a high nutritional value product, but the nature of the protein of the pancreatic meat powder even assures higher quality, nutritional value or biologic value. In particular, the protein contains high levels of desirable amino acids, specifically tryptophane.

The organic fat solvents which are used for the initial defatting extraction may be selected from many that are recognized as being used for such purposes. Among such solvents may be mentioned benzene, hexane, pentane, toluene, cyclopentane, cyclohexane, and still others.

Useful polar organic solvents are the halogenated derivatives of low-boiling aliphatic hydrocarbons. Among such solvents are propylene dichloride, trichlorethylene, perchlorethylene and others. A preferred solvent is ethylene dichloride.

The fat may be extracted from the comminuted pancreatic residue in a batch process by depositing the tissue material in a bath of organic fat solvent, and this is an advantageous method because of its effectiveness and simplicity. If desired for some practices, azeotropic distillation may be employed, particularly where substantial amounts of water are retained in the pancreatic residue. Such azeotropic removal is described in greater detail in the present applicant's issued U.S. Patent No. 2,503,313. If desired, the solvent material may be separated with the use of distillation, although this is not necessary. Various other steps may be employed to practice the method for preparing the pancreatic meat powder. These include the use of vacuum and moderate temperature levels to remove any polar organic solvent, alcohol or acid which may remain in the pancreatic tissue material.

The fat extratction step may be used with the application of heat, if desired, so that the polar organic solvent is boiling to thereby more rapidly and efficiently extract the fat. Such a heated solvent may also be removed by use of distillation apparatus to leave the essentially defatted pancreatic tissue material. It is a preferred practice to attempt to remove as much of the acid from the pancreatic residue as is possible prior to the fat extraction step with polar organic solvent. This may be done in various ways such as washing or neutralizing the acid. The acid may be neutralized, for example, with lower concentrations of an alkali such as sodium hydroxide.

The deodorization step obtained with alcohol treatment permits various concentrations of alcohol to be used. In general, it is preferred to employ a combination of aqueous alcohol and absolute alcohol. The aqueous alcohol may be used in concentrations of about 80% alcohol.

By way of illustrating an example, pancreatic residue is obtained from which insulin has been extracted. Substantially all the enzymes are removed or inactivated. The residue is comminuted into small particle sizes and contacted with three times its volume of ethylene dichloride. The residue is extracted with the ethylene dichloride until the fat content is lowered to below 2% by weight. The ethylene dichloride is separated by draining the solvent from the container and the defatted material is found to contain 1.58% of fat. This defatted material is then mixed with two times its volume of methanol, and the tissue material remains in contact with the methanol until the fat content falls below 1% to trace levels; and the objectionable gutty odor factors are removed. The pancreatic food product is separated from the alcohol by draining the alcohol from a container and the product is then subjected to drying under mild temperature and partial vacuum. The resulting powdered pancreatic meat is essentially tasteless, is free of all objectionable organoleptic factors of taste and smell and has a protein content of close to 90%. The protein has high levels of trytophane relative to the levels of this amino acid found in other glandular materials.

Various known modifications may be practiced in treating the fresh pancreas with the acidified alcoholic solutions to extract the insulin and leave the residue for processing into the food product. The conventional ethyl alcohol and hydrochloric acid extraction is described in U.S. Patent No. 2,695,861, for example. This patent also teaches the modification of using phosphoric acid so that this acid may later be removed as an insoluble ammonium salt. Other review articles on this subject are found in Research Today, vol. 10, No. 3 58–86 (1954) and Science, vol. 129, 1340–1344, 1959.

The invention may now be practiced in the various ways which will occur to practitioners and, all such practice comprises the part of the present invention so long as it comes within the terms of the following claims as given further meaning by the language of the preceding specification.

What is claimed is:

1. A dry, high protein pancreatic food which is palatably acceptable, including
    a powered pancreatic tissue residue, said powered tissue residue having had its insulin and enzyme content substantially removed,
    said product further having substantially all undesirable organoleptic factors removed,
    said product having a protein content at least as high as 80% by weight of the residue, and
    said product having a fat content of less than about 1% by weight of said residue.

2. A pancreatic food as in claim 1 wherein the protein content is about 90% by weight of the dry products and the fat content is present in trace amounts of substantially less than 1% by weight of the dry product.

3. A pancreatic food as in claim 1 in which the high protein content is characterized further by improved biologic value relative to the protein content of the other glandular materials, and said high biologic value is particularly characterized by high tryptophane levels relative to the tryptophane levels of other glandular materials.

4. A pancreatic food as in claim 1 which is an alcohol treated product by which the undesirable organoleptic factors are removed.

5. A pancreatic food as in claim 4 which is an isopropanol treated product.

6. A pancreatic food as in claim 4 wherein the alcohol treated product is substantially free of phosphatides which would otherwise provide a source for conversion to malodorous glycerides.

7. A pancreatic food as in claim 1 which is a polar solvent treated product by which the water is removed and the fat is substantially removed.

8. A pancreatic food as in claim 7 is an ethylene dichloride treated product.

9. A pancreatic food as in claim 1 which is an acid-alcohol treated fresh pancreas substantially free of its original enzyme activity.

10. A pancreatic food as in claim 9 wherein the residue is substantially free of the acid-alcohol used to obtain the substantially enzyme free residue.

11. A powdered pancreatic meat product which is an acid-alcohol treated tissue residue substantially free of active enzymes,
    which residue is a polar solvent treated material free of water and substantially free of fat,
    which material is an alcohol treated product substantially free of objectionable organoleptic factors, including those of taste and smell,
    which product is of a high protein content of high biologic value in an amount of at least about 80% protein by weight of the dry product, and
    which product is of a low fat content in an amount of less than about 1% by weight of the dry product.

12. A method for preparing dry pancreatic meat product of high biologic value which includes the steps of
    dehydrating and substantially defatting a pancreatic tissue residue with an organic fat solvent, said residue being substantially freed of active enzymes, including insulin,
    treating the dehydrated and substantially defatted residue with an alcohol to remove the malodorous factors and
    drying the alcohol treated material to obtain the dry pancreatic meat product of a high protein content and a low fat content, which product is free of objectionable organoleptic factors, including those of taste and smell, and which protein content contains high levels of desirable amino acids of a substantially unimpaired nutritional value.

13. A method as in claim 12 in which the pancreatic residue is treated with ethylene dichloride.

14. A method as in claim 12 wherein the dehydrated and substantially defatted residue is treated with isopropanol.

15. A method as in claim 12 wherein the residue substantially free of enzymes is obtained by treating fresh pancreas with an acid-alcohol mixture, and which further includes the step of removing said acid-alcohol from the residue during the practice of the process for obtaining the dry pancreatic meat product.

16. A method as in claim 12 which further includes the steps of removing the organic fat solvent, after dehydration and substantial defatting, by applying heat and vacuum to the pancreatic material.

17. A method as in claim 12 which further includes the step of removing the alcohol, after treatment to remove the malodorous factors, by applying heat and vacuum to the pancreatic product.

References Cited

UNITED STATES PATENTS

| | | | |
|---|---|---|---|
| 2,358,869 | 9/1944 | Maurer et al. | 99—208 X |
| 2,503,312 | 4/1950 | Worsham et al. | 99—208 X |
| 2,503,313 | 4/1950 | Levin | 195—65 |
| 2,115,418 | 4/1938 | Dragstedt | 424—178 X |

NORMAN YUDKOFF, Primary Examiner

J. SOFER, Assistant Examiner

U.S. Cl. X.R.

195—65; 260—412, 412.7; 424—110